United States Patent
Nichols et al.

(10) Patent No.: US 7,313,476 B2
(45) Date of Patent: *Dec. 25, 2007

(54) METHOD AND SYSTEM FOR CONTROLLING A VALUABLE MOVABLE ITEM

(75) Inventors: Mark Nichols, Christ Church (NZ); Gregory T. Janky, Sammamish, WA (US); Dennis Workman, Morgan Hill, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 10/952,607

(22) Filed: Sep. 28, 2004

(65) Prior Publication Data

US 2005/0192741 A1   Sep. 1, 2005

Related U.S. Application Data

(63) Continuation-in-part of application No. 10/392,995, filed on Mar. 19, 2003, now Pat. No. 7,050,907, which is a continuation-in-part of application No. 10/222,532, filed on Aug. 15, 2002, now Pat. No. 6,801,853.

(51) Int. Cl.
  *G01C 21/26*   (2006.01)
(52) U.S. Cl. ............ 701/213; 701/208; 701/209; 340/989
(58) Field of Classification Search ......... 701/207, 701/213, 208, 209, 21; 340/989, 992; 342/357.01, 342/357.06, 357.08, 457; 455/456.1–456
  See application file for complete search history.

(56) References Cited

U.S. PATENT DOCUMENTS

| | | | |
|---|---|---|---|
| 5,650,770 A | 7/1997 | Schlager et al. | 340/573 |
| 5,917,405 A | 6/1999 | Joao | |
| 6,356,196 B1 * | 3/2002 | Wong et al. | 340/571 |
| 6,362,736 B1 * | 3/2002 | Gehlot | 340/568.1 |
| 6,505,049 B1 * | 1/2003 | Dorenbosch | 455/456.2 |
| 6,512,465 B2 * | 1/2003 | Flick | 340/989 |
| 6,609,064 B1 * | 8/2003 | Dean | 701/213 |
| 6,657,587 B1 * | 12/2003 | Mohan | 342/357.1 |
| 6,658,349 B2 * | 12/2003 | Cline | 701/207 |
| 6,801,853 B2 * | 10/2004 | Workman | 701/213 |
| 6,804,602 B2 * | 10/2004 | Impson et al. | 701/117 |
| 6,864,789 B2 | 3/2005 | Wolfe | |
| 2002/0070856 A1 | 6/2002 | Wolfe | |
| 2004/0034470 A1 | 2/2004 | Workman | 701/213 |
| 2005/0030175 A1 | 2/2005 | Wolfe | |
| 2005/0179541 A1 | 8/2005 | Wolfe | |

FOREIGN PATENT DOCUMENTS

GB   2373086   9/2002

(Continued)

*Primary Examiner*—Richard M. Camby (57) ABSTRACT

One embodiment in accordance with the invention can include a controller that can be coupled with a position determining component, and a motion detecting component. In one embodiment, the motion detecting component detects motion of a valuable movable item and generates a signal to the controller indicating the motion. The controller, in response to the signal, causes the position determining component to determine the geographic location of the valuable movable item. A determination is made as to whether the geographic location is within a pre-defined zone. In response to the determination, a command can be generated for controlling the valuable movable item.

9 Claims, 6 Drawing Sheets

FOREIGN PATENT DOCUMENTS

| WO | WO-03/007261 | 1/2003 |
| WO | 04/017272 | 2/2004 |
| WO | WO-2004/017272 | 2/2004 |
| WO | WO-2004/083888 | 9/2004 |
| WO | WO/2005/017846 | 2/2005 |

* cited by examiner

METHOD AND SYSTEM FOR CONTROLLING A VALUABLE MOVABLE ITEM

RELATED APPLICATIONS

This application is a continuation-in-part of and claims the benefit of U.S. patent application Ser. No. 10/392,995 filed on Mar. 19, 2003 now U.S. Pat. No. 7,050,907 entitled "A Method and System For Controlling An Electronic Device" by Gregory T. Janky et al., which is a continuation-in-part of and claims the benefit of U.S. patent application Ser. No. 10/222,532 filed Aug. 15, 2002 now U.S. Pat. No. 6,801,853 entitled "A Portable Motion-Activated Position Reporting Device" by Dennis Workman. Both are assigned to the assignee of the present invention, and both are hereby incorporated by reference in their entirety herein.

BACKGROUND

Position reporting devices are frequently used to locate and report the position of a person or object. A typical position reporting device combines a navigation system such as the Global Positioning System (GPS) module with a mobile communications system such as a cellular modem to determine the position or geographic location of a person or asset being tracked and report their position to a tracking facility. Position reporting devices are used in a variety of systems in which timely position information is required such as fleet tracking and asset recovery systems.

Fleet tracking systems allow a user to monitor the position of a ship or vehicle carrying a position reporting device by sending a succession of position fixes. The phrase "position fix" refers to a process of determining an unknown location using a fixed reference point or points. For example, the course of a vehicle being tracked can be inferred using successive position fixes sent by the position reporting device. In a similar manner, it can be inferred that the vehicle is not moving when successive position fixes report the same position. Fleet tracking systems are commonly used by delivery services for routing and dispatching of vehicles. Asset recovery systems report the position of stolen or missing property (e.g., a stolen car) to a service provider or to the police in order to facilitate recovering the property.

A drawback associated with position reporting devices is the amount of power they consume. While battery powered position reporting devices do exist, the amount of power they consume when turned on can necessitate frequent battery changes in order to continue operating. This makes using position reporting devices inconvenient to some users in that they can require an excessive amount of maintenance to continue operating.

Recently, concerns have been communicated regarding the operation of various electronic devices in certain environments. For example, airlines request that passengers refrain from using mobile telephones and laptop computers during takeoffs and landings because they can cause electromagnetic interference that can impair the operation of navigational and other instrumentation systems aboard airplanes. Since July of 2001, the Pentagon has had a moratorium on the construction of additional wireless communications networks, and bars connections to classified networks or computers using devices that are not explicitly approved by the Department of Defense. This is to prevent the unintentional compromise of secure data and includes personal wireless devices such as pagers, Personal Data Assistants (PDAs), and wireless electronic mail (e-mail) devices. As another example, many public facilities such as theaters and restaurants now request that their patrons turn off their wireless devices (e.g., mobile telephones and pagers) while on their premises.

SUMMARY

One embodiment in accordance with the invention can include a controller that can be coupled with a position determining component, and a motion detecting component. In one embodiment, the motion detecting component detects motion of a valuable movable item and generates a signal to the controller indicating the motion. The controller, in response to the signal, causes the position determining component to determine the geographic location of the valuable movable item. A determination is made as to whether the geographic location is within a pre-defined zone. In response to the determination, a command can be generated for controlling the valuable movable item.

Embodiments of the invention can include methods and systems for controlling a valuable movable item. In one embodiment, a controller is coupled with a position determining component, a wireless communications component, and a motion detecting component. In one embodiment, the motion detecting component detects movement of the valuable movable item and generates a signal to the controller indicating the movement. The controller, in response to the signal, activates the position determining and/or reporting device to determine the geographic location of the valuable movable item. In one embodiment, the controller compares the geographic location of the electronic device with a pre-defined zone and generates a command for controlling the valuable movable item based upon the comparison.

Embodiments of the present invention can be used to cause a valuable movable item to perform a particular task upon entering or leaving a designated zone. For example, embodiments of the invention can be used to automatically inactivate the valuable movable item (e.g., a mobile telephone) when it is brought into a restricted area. This may include theaters, airports, hospitals, gas stations, or other areas where operating the electronic device may cause, for example, unwanted electromagnetic interference with other equipment in the area. A user can designate these areas to reduce the possibility of the user forgetting to shut down the device. In another embodiment, the user can accept a pre-packaged list of such exclusion zones for automatic implementation of this shut-off feature.

Similarly, embodiments of the invention can be used to cause a valuable movable item to perform a particular task when it is moved outside of a designated zone. Thus, when a user leaves a theater, hospital, airport, or the like, embodiments of the invention can cause the valuable movable item to be automatically activated. As an example, a user's mobile telephone can be activated when the user moves outside of a theater.

In another embodiment, the present invention can be used as a theft deterrent. For example, if valuable cargo is moved outside of a zone designated by the owner, the present invention may cause the cargo to sound an alarm, send a notification to a security service provider, and/or contact the owner of the cargo (e.g., contacting the owner via a pager, mobile phone, or e-mail message).

While particular embodiments of the present invention have been specifically described within this summary, it is noted that the invention is not limited to this embodiment. The invention is intended to cover alternatives, modifica-

DETAILED DESCRIPTION

Reference will now be made in detail to embodiments of the present invention, examples of which are illustrated in the accompanying drawings. While the present invention will be described in conjunction with the following embodiments, it will be understood that they are not intended to limit the invention to these embodiments alone. On the contrary, the invention is intended to cover alternatives, modifications, and equivalents that may be included within the scope of the invention as defined by the appended claims. Furthermore, in the following detailed description of the invention, numerous specific details are set forth in order to provide a thorough understanding of the invention. However, embodiments of the invention may be practiced without these specific details. In other instances, well-known methods, procedures, components, and circuits have not been described in detail so as not to unnecessarily obscure aspects of the invention.

Embodiments of the present invention can pertain to a method and system for controlling a valuable movable item. Embodiments of the present invention may be used to monitor the position of a valuable movable item and to generate commands for causing the item to automatically perform one or more designated actions based upon its geographic location. Embodiments of the present invention can also be used to detect and report unauthorized movement of a valuable movable item and to assist in recovering it when unauthorized movement occurs. Embodiments of the invention can detect and report behavior of a valuable movable item by employing a table lookup or table of events that induces the reporting functionality. Embodiments of the present invention may be used to generate commands for causing a valuable movable item to automatically perform one or more designated actions based upon whether its bill is past due. Embodiment of the invention may be used to detect and report any malfunctions of a valuable movable item.

Embodiments of the present invention comprise an initiating component disposed in a valuable movable item. In accordance with embodiments of the invention, the sub-components of the initiating component can be distributed within the valuable movable item so that they fit within its envelope, casing, or housing. The initiating component can utilize a motion detecting component to detect movement of the valuable movable item and sends a signal to a controller. In response to receiving this signal, the controller initiates a position determining component to determine the geographic location of the valuable movable item. This can extend the battery life of the initiating component (or the battery life of the valuable movable item it utilizing it) since the initiating component draws a minimal amount of power until movement of the item is detected. In one embodiment, the geographic location is compared with the coordinates of a zone of interest to the user. Depending upon what zone the valuable movable item is located within, the controller generates one or more commands for causing the valuable movable item to perform one or more specific actions.

Embodiments of the present invention can utilize a geo-fencing system in which a set of position coordinates is provided which defines a pre-defined zone. In embodiments of the present invention, upon entering or leaving a pre-defined zone, one or more commands can be generated for causing the valuable movable item to perform one or more particular tasks. For example, embodiments of the present invention can be configured to automatically shut down the valuable movable item when a particular zone is entered and to automatically activate the valuable movable item when that zone is left. Additionally, the converse is true: embodiments of the present invention can be configured to automatically turn on the valuable moveable item when a particular zone is entered and to automatically shut down the valuable moveable item when the zone is left. In another embodiment, the position coordinates define a zone in which the asset can be moved without triggering an alarm. When the valuable movable item is moved outside of that zone, it provides a signal which may be used to activate an audible alarm until inactivated. Alternatively, this same signal can initiate a wireless message which is sent to a monitoring service that notifies the owner of the device and/or a law enforcement agency in order to facilitate recovering the valuable movable item. In other embodiments, a wireless message can be sent to a monitoring service that notifies the owner of the device and/or a law enforcement agency that the valuable movable item is moving when it should not be moving or the valuable movable item is not moving when it should be moving.

An example of a geo-fencing system is described in U.S. Pat. No. 5,751,245 entitled "Vehicle Route and Schedule Exception Reporting System" by James Janky, Eric Klein, and John Schipper, assigned to Trimble Navigation Ltd. of Sunnyvale Calif., and incorporated by reference herein in its entirety.

Figure 1:
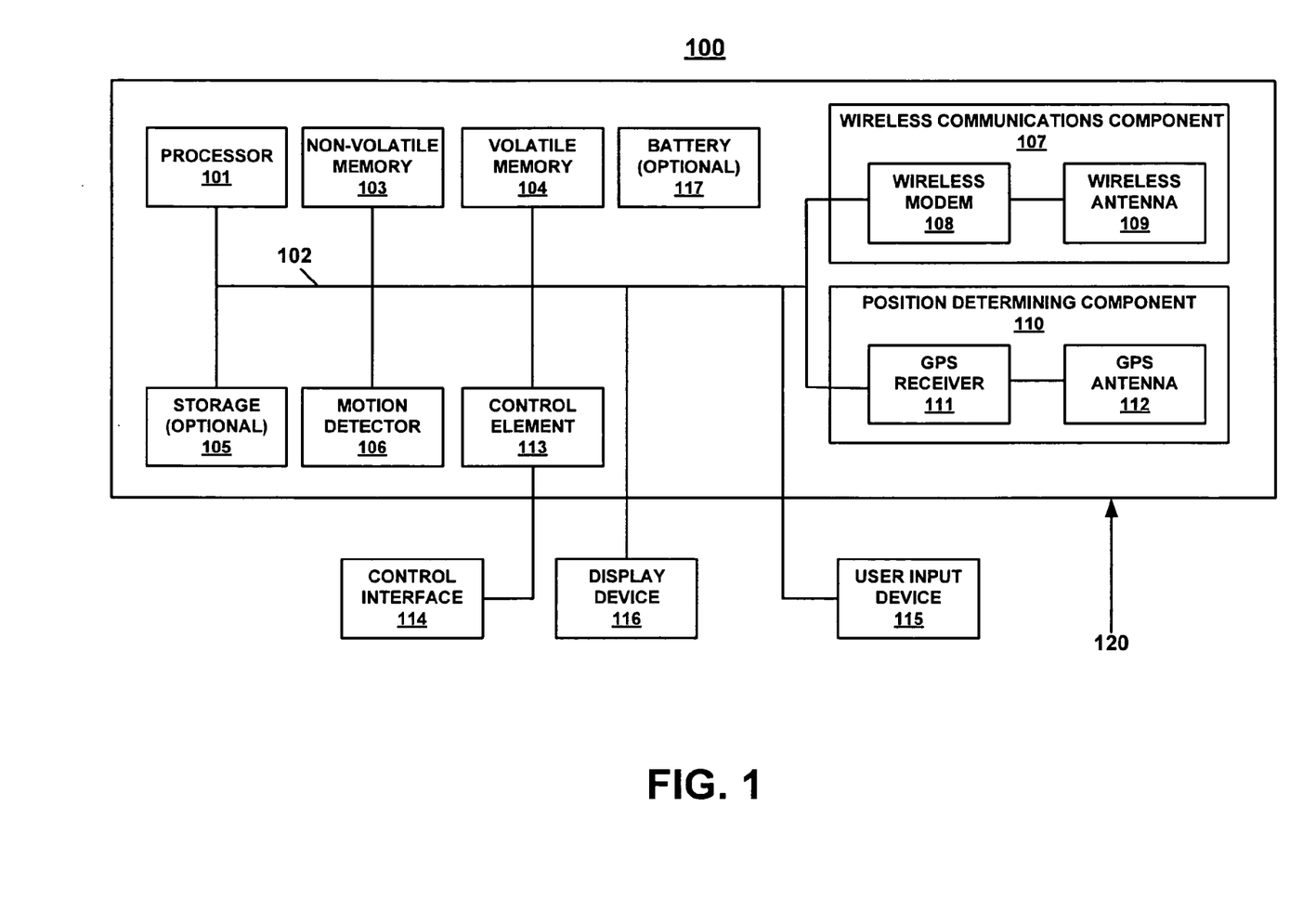
FIG. 1 is a block diagram of an exemplary initiating component in accordance with embodiments of the invention.

FIG. 1 is a block diagram of an exemplary initiating component 100 in accordance with embodiments of the invention. The initiating component 100 includes a processor 101 coupled with an address/data bus 102. Processor 101 is for processing digital information and instructions and bus 102 is for conveying digital information between the various components of initiating component 100. Also coupled with bus 102 is non-volatile memory 103, e.g., read only memory (ROM), for storing information and instructions of a more permanent nature along with volatile memory 104, e.g., random access memory (RAM), for storing the digital information and instructions of a more volatile nature. In addition, initiating component 100 may optionally include a data storage device 105 for storing vast amounts of data.

In embodiments of the present invention, data storage device 105 may include a removable storage medium such as a smart card or an optical data storage device. Alternatively, data storage device 105 may include a programmable data storage device such as a flash memory device to facilitate quickly updating data. It is noted that instructions for processor 101 as well as position coordinates which define a pre-defined zone can be stored either in volatile memory 104, data storage device 105, and/or in an external storage device (not shown). Similarly, previously determined geographic locations of initiating component 100, and previously sampled GPS signals can be stored in volatile memory 104, data storage device 105, and/or in an external storage device. Configuration data for determining what action should be initiated depending upon one or more predefined circumstances (e.g., the current time and/or location) of initiating component 100 can also be stored in volatile memory 104, data storage device 105, and/or in an external storage device.

Within FIG. 1, initiating component 100 further includes a motion detector 106 coupled with bus 102 for detecting changes in the motion state of initiating component 100. In one embodiment, motion detector 106 can detect the vibration associated with the movement of initiating component 100 and indicates this movement to processor 101 when changes in the vibration of initiating component 100 are detected. In other embodiments of the present invention, motion detector 106 may be an acceleration sensor, a tilt sensor, a rotation sensor, a gyroscope, etc. However, while the present embodiment recites these particular implementations of motion detector 106, the present invention is well suited to utilize a variety of devices for detecting movement of initiating component 100 and for indicating this movement to processor 101.

In accordance with embodiments of the present invention, motion detector 106 can detect when initiating component 100 transitions from a substantially stationary state to a moving state. Motion detector 106 can also detect when initiating component 100 transitions from a moving state to a substantially stationary state and/or changes in the rate of movement of initiating component 100. Accordingly, in embodiments of the present invention, motion detector 106 can detect changes in the state of motion of initiating component 100 such as starting or stopping of motion, as well as acceleration or deceleration. In response to these changes in motion, an interrupt is generated by motion detector 106. In response to the interrupt from motion detector 106, processor 101 changes the operating state of initiating component 100 from an idle operating state, in which a few components (e.g., a wireless communications component 107 and a position determining component 110) of initiating component 100 draw a minimal amount of power, to an active operating state in which the initiating component 100 draws additional power.

Within FIG. 1, wireless communications component 107, including a wireless modem 108 and a wireless antenna 109, are coupled with bus 102. The position determining component 110, including a GPS receiver 111 and a GPS antenna 112, are coupled with bus 102.

Wireless communications component 107 can be for transmitting and receiving wireless messages (e.g., data and/or commands). In one embodiment, wireless communications component 107 can include a cellular wireless antenna 109 and a cellular wireless modem 108. In one embodiment, initiating component 100 sends and receives messages using the Short Message Service (SMS). However, the present invention is well suited to utilize other message formats as well. In other embodiments of the present invention, wireless communications component 107 may include a Bluetooth wireless communications device, or another wireless communications device such as a Wi-Fi transceiver. Wi-Fi transceivers are often used to create local area networks (LANs) between a portable computer and an Internet access point in public areas such as airports, coffee shops, restaurants, libraries, and the like.

Position determining system 110 can be for determining the location of initiating component 100. In embodiments of the present invention, position determining component 110 can include a GPS antenna 112 and a GPS receiver 111. However, while the present embodiment specifically recites a GPS position determining system, embodiments of the present invention are well suited to utilize a variety of terrestrial-based and satellite-based position determining systems as well.

Within FIG. 1, a control element 113 is coupled with bus 102 and can be for generating a control signal via control interface 114 depending upon the current time and/or location of initiating component 100.

Devices that are optionally coupled to initiating component 100 can include a display device 116 for displaying information to a user. Display device 116 can be a liquid crystal device (LCD), cathode ray tube (CRT), a field emission display (FED), plasma display, or other display device suitable for creating graphic images and alpha-numeric characters recognizable to a user. Additionally, a user input device 115 may also be coupled with bus 102 in embodiments of the present invention. In embodiments of the present invention, user input device 115 may include, but is not limited to, a keyboard, and a cursor control device (e.g., a mouse, trackball, light pen, touch pad, joystick, etc.), for inputting data, selections, updates, and controlling initiating component 100. The initiating component 100 may optionally include a battery 117 for providing power for initiating component 100. While the present embodiment recites a battery powered device, the present invention is well suited to be electrically coupled with the device or item it is controlling (or associated with) and for drawing power from that item. For example, if initiating component 100 is disposed within a laptop computer, it may draw power from the laptop computer itself.

Within FIG. 1, in embodiments of the present invention, components of initiating component 100 may be disposed upon a printed circuit board 120 such as a Personal Computer Memory Card Industry Association (PCMCIA) card, etc. This allows embodiments of the present invention to be used in a variety of valuable movable items such as, but not limited to, any type of cargo, electric generators, construction vehicles, tractors, trucks, super-computers, tools, mobile telephones, laptop computers, personal digital assistants (PDAs), automotive electrical systems, and the like. However, in other implementations of the present invention, initiating component 100 may be a stand alone device that is used to control another device or item. For example, initiating component 100 may be installed in a backhoe and used to initiate an action depending upon the location of the backhoe. Note that the components of initiating component 100 may be disposed within a housing (not shown). As such, in embodiments of the invention, a valuable movable item can be fabricated such that the housing containing initiating component 100 can be incorporated or integrated with it. Alternatively, in embodiments of the invention, components of initiating component 100 can be distributed within a valuable movable item such that they fit within the item's housing, casing, or envelope. For example, if the valuable movable item is a tool or appliance, components of initiating component 100 can be separately distributed within the tool or appliance so that they fit within its housing, casing, or envelope.

It is appreciated that some of the components recited in the above discussion may be omitted in embodiments of the present invention. For example, when initiating component 100 is disposed within a laptop computer or a PDA, display device 116 and user input device 115 may be redundant and therefore omitted to reduce the cost of initiating component 100. In other implementations of embodiments of the present invention, initiating component 100 may be disposed in a valuable movable item that already has a wireless communications capability (e.g., a mobile telephone). Thus, wireless communications component 107 may be omitted in embodiments of the present invention in order to reduce the cost of initiating component 100. Additionally, control element 113 may be omitted in embodiments of the present invention. For example, a control signal may be generated by processor 101 via control interface 114 for controlling a valuable movable item.

Within FIG. 1, in embodiments of the present invention, when motion detector 106 detects movement of initiating component 100, it can generate an interrupt signal to processor 101. In response to the interrupt signal, processor 101 can activate other components of initiating component 100 such as wireless communications component 107 and position determining component 110. The geographic location of initiating component 100 can then be determined using position determining component 110. Processor 101 can compare the present geographic location with geographic coordinates that define a pre-defined zone. The coordinates of the pre-defined zone may reside in volatile memory 104 and/or in storage device 105. Based upon this comparison, processor 101 can cause control element 113 to generate one or more commands for controlling the valuable movable item which is associated with initiating component 100, or in which initiating component 100 resides.

Alternatively, processor 101 may generate the one or more commands for controlling the valuable movable item itself. For example, initiating component 100 may be configured to generate one or more commands causing the valuable movable item to become inactivated when it enters a restricted zone such as an theater, or the gangway leading from the departure lounge to an aircraft while boarding. Since the initiating component 100 can be programmed to operate autonomously to perform this shutdown function, it can work for valuable movable item which are stored in luggage as well, performing another valuable service by ceasing battery drain while located in an unusable space. When the valuable movable item moves outside of the restricted zone, processor 101 may generate a signal causing the item to become activated again. This can be a great convenience to users who may forget to turn off their valuable movable items when they enter a restricted area or to turn them back on when they leave the restricted area.

Within FIG. 1, in embodiments of the present invention, storage device 105 can store a database of geographic coordinates which can define a plurality of pre-defined zones and associated commands that are to be generated by processor 101 depending upon whether the valuable movable item is inside or outside a pre-defined zone. Additionally, the geographic coordinates can define a route or plurality of routes. If the valuable movable item deviates from a specified route, processor 101 can generate commands to the movable item. For example, processor 101 can cause the valuable movable item to sound an alarm or other noise as a theft deterrent if the device is removed from a specified zone. Alternatively, processor 101 can initiate sending a message via wireless communications device 107 notifying the owner of the valuable movable item that it has left a specified zone, or notify police or other agencies. Additionally, processor 101 can initiate continuous location updates to assist in recovering the valuable movable item if it has been stolen.

The geographic location or route information used to determine what action should be initiated by embodiments of the present invention may further be modified using temporal information. For example, if initiating component 100 is disposed within a valuable movable item, such as, an automobile, time parameters may be used in conjunction with location parameters to determine what action should be initiated by embodiments of the present invention. Accordingly, a user could designate his or her typical route used when commuting to work and the hours when the automobile is permitted to be within that route. If the automobile is stolen, even if it is at a geographic location within the pre-defined boundaries of the commuting route, initiating component 100 may generate one or more control signals since it is at that location at the wrong time of the day.

Within FIG. 1, initiating component 100 may initiate generating a message conveying that the automobile has been stolen as described above, or may in some manner disable the automobile to prevent further movement of the automobile. For example, initiating component 100 may be coupled with the ignition system and/or the computer of the automobile. After determining that unauthorized movement of the automobile has occurred, initiating component 100 may generate a control signal to disable the automobile's engine the next time motion detector 106 determines that the car has stopped moving. In this manner, initiating component 100 does not disable the automobile, for example, in the middle of a highway which may endanger other commuters. Note that an initiating device lacking the motion detector of embodiments of the present invention would not be able to perform in this manner, and may provide a less flexible or responsive solution to some situations addressed by embodiments of the present invention.

Utilizing a motion detector with a position determining device is seemingly counter-intuitive or at least redundant in the current position reporting environment which relies upon successive position fixes to imply movement of the reporting device. For example, receiving a series of position reports which come from different locations implies that the initiating device is in motion. Alternatively, receiving a series of position reports which come from the same location implies that the initiating device is stationary. Therefore, it was considered redundant to incorporate a motion-detecting component into a device which already had an implied function of detecting motion.

However, providing initiating component 100 with motion detector 106 is advantageous since it reduces the amount of time that components of initiating component 100 are activated in order to determine a geographic location and thus extends the life of battery 117 or the battery life of the valuable movable item with which initiating component 100 may be coupled. In conventional initiating devices, determining whether the device was moving or stationary depended upon determining and comparing successive position fixes. If successive position fixes were from the same location, it was inferred that the device was stationary. If successive position fixes were from different locations, it was inferred that the device was in motion. These position fixes had to be provided at a regular interval in order to provide timely notification that the device was being moved. However, providing successive position fixes for a device which has not moved is an unnecessary drain of battery power, especially when the device remains stationary for extended periods of time. This in turn is burdensome to users of the device who are required to frequently replace the batteries (e.g., 117) of initiating component 100 or the battery power of the valuable movable item in which initiating component 100 is disposed or to couple the valuable movable item to an external power source.

Within FIG. 1, in embodiments of the present invention, storage device 105 may also store previously determined geographic positions of initiating component 100 and/or previously sampled GPS signals. This aids signal acquisition in environments where a clear path to satellites is either partially or totally obscured, as inside a building. In some GPS implementations, previously sampled GPS signals can be used to more rapidly determine the current location of a GPS receiver (e.g., 111) and improve its sensitivity during low signal-to-noise ratio conditions.

One such system is described in U.S. Pat. No. 6,289,041 entitled "Fast Acquisition, High Sensitivity GPS Receiver" by Norman F. Krasner, assigned to Snap Track Inc, of San Jose, Calif., and is incorporated by reference herein in its entirety. In this patent, Krasner describes a system in which a currently sampled GPS signal is accumulated with a previously sampled GPS signal in order to improve the sensitivity and acquisition speed of the receiver. However, the present invention is well suited to utilize a variety of implementations for improving the sensitivity of a GPS receiver during low signal-to-noise ratio conditions.

While embodiments of the present invention can be utilized as a stand alone device, other embodiments of the present invention may utilize other methods for determining the location of a valuable movable item. For example, many mobile telephone systems are compliant with the E911 standards which seek to improve the quality of wireless 911 service. Phase 1 of the program requires carriers to report the location of the antenna receiving the wireless call. Phase 2 of the program requires carriers to provide much more exact location information (e.g., within 50-100 meters).

One solution for providing Phase 2 level compliance is a server aided location determining system as described in U.S. Pat. No. 6,131,067 entitled "Client-Server Based Remote Locator Device" by Richard Girerd and Norman Krasner, assigned to SnapTrack Inc. of San Jose, Calif., and which is incorporated by reference in its entirety herein. In this system, a remote device sends GPS data to a server which processes the data to derive the location of the remote device. The server then transmits the derived location to a client which can display the location of the remote device. In embodiments of Girerd, the remote device can send unprocessed position signals (e.g., GPS satellite signals) to the server which are then processed to derive the location of the remote device.

An example of emerging terrestrial-based technology is described in U.S. patent application Ser. No. 10/159,478 entitled "Position Location Using Global Positioning Signals Augmented by Broadcast Television Signals" by Matthew Rabinowitz and James Spilker, filed May 31, 2002 and assigned to Rosum Corporation of Redwood City, Calif., which is incorporated by reference in its entirety herein. In the above referenced Application, a method and system is described that uses broadcast television signals in conjunction with GPS signals to determine the position of a user terminal.

Another example of emerging terrestrial-based technology is described in U.S. patent application Ser. No. 10/054,302 entitled "Position Location Using Broadcast Analog Television Signals" by Matthew Rabinowitz and James Spilker, filed Jan. 22, 2002 and assigned to Rosum Corporation of Redwood City, Calif., which is incorporated by reference in its entirety herein. In the above referenced Application, a method and system is described that uses a plurality of analog television transmitters as known reference points to determine the location of a user terminal.

In U.S. patent application Ser. No. 09/932,010 entitled "Position Location Using Terrestrial Digital Video Broadcast Television Signals" filed Aug. 17, 2001 and in U.S. patent application Ser. No. 10/054,262 entitled "Time-Gated Delay Lock Loop Tracking of Digital Television Signals" filed Jan. 22, 2002 by Matthew Rabinowitz and James Spilker, and assigned to Rosum Corporation of Redwood City, Calif., which are incorporated by reference in their entirety herein. In the above referenced Applications, two methods are described that use a plurality of digital television transmitters as known reference points to determine the location of a user terminal.

Thus, embodiments of the present invention are well suited to enable a valuable movable item to determine its location on a stand alone basis, or in conjunction with other so-called "aiding" systems. When the valuable movable item is outside of the coverage area of a wireless communications system, it can still determine its location using embodiments of the present invention.

Figure 2:
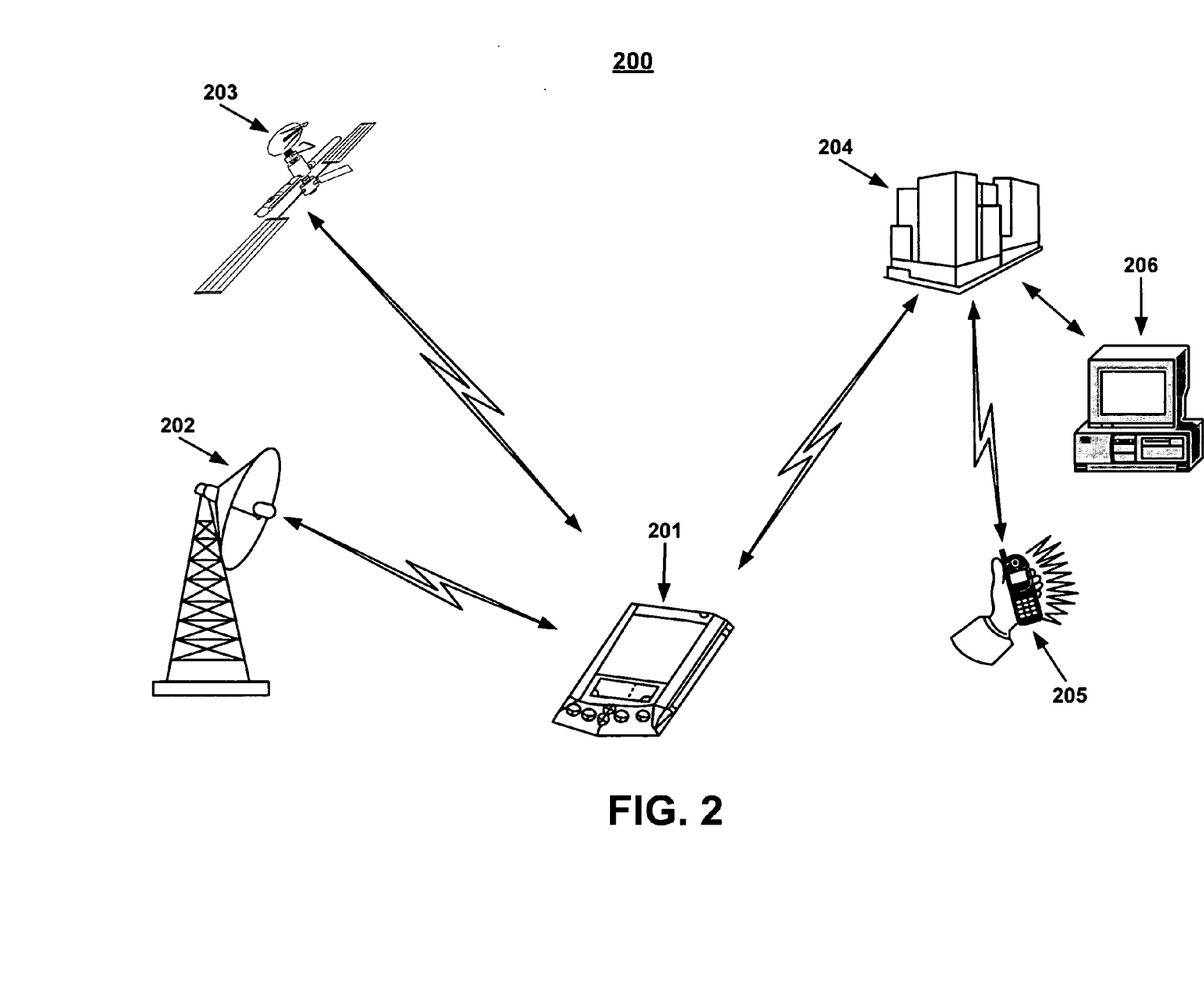
FIG. 2 is a diagram of a position tracking system in accordance with embodiments of the invention.

FIG. 2 is a diagram of a position tracking system 200 utilized in accordance with embodiments of the present invention. System 200 includes a valuable movable item 201 that can be coupled with an initiating component 100 (not shown), a position determining system (e.g., 202 or 203), and a position tracking service provider 204. Note that the valuable movable item 201 can be implemented in a wide variety of ways in accordance with embodiments of the invention. For example, the valuable movable item 201 can consist of, but not limited to, an electronic device such as a item of test equipment or other valuable instrument, a survey instrument including an optical device known as a total station, or a GPS survey instrument as are manufactured by Trimble Navigation Ltd., Leica, or Topcon. Further examples include a motorized but moveable (man-portable) machine tool, an automobile, a tractor, an earth moving machine such as a bulldozer, an earth mover, a scraper, or an earth-transporting truck. More examples include an appliance, any type of cargo including trailers or cargo shipping containers, a computing device, a super-computer, any other type of truck including fuel or chemical transports, or any type of vehicle. In the embodiment of FIG. 2, valuable movable item 201 can be capable of wireless communications with service provider 204. When valuable movable item 201 is moved, initiating component 100 can detect the movement, and can determine its geographic location using position determining system 202 or position determining system 203.

In accordance with embodiments of the present invention, position determining system 202 is a terrestrial-based position determining system. There are a variety of terrestrial-based position determining systems which can be utilized by embodiments of the present invention such as, but not limited to, LORAN-C, Decca, radio beacons, and the like. Furthermore, the present invention is well suited to utilize future implementations of terrestrial-based position determining systems, e.g., the Rosum positioning technology.

Within FIG. 2, in other embodiments of the present invention, initiating component 100 utilizes a satellite-based position determining system 203 to determine its position. There are a variety of satellite-base position determining systems which can be utilized by embodiments of the present invention such as, but not limited to, the Global Positioning System (GPS), Differential GPS (DGPS), Eurofix DGPS, the Global Navigation Satellite System (GLONASS), the Galileo system, and the like. Furthermore, the present invention is well suited to utilize future implementations of satellite-based position determining systems.

As described above, embodiments of the present invention can determine the location of valuable movable item 201 and then compare the present location of movable item 201 with a set of geographic coordinates of a pre-defined zone or route. Depending upon the relationship between the present location of valuable movable item 201 and the pre-defined zone, initiating component 100 may generate one or more commands causing valuable movable item 201 to perform one or more actions. For example, if valuable movable item 201 is moved from a specified zone or route without permission, a wireless message may be sent to position tracking service provider 204 as notification. Alternatively, initiating component 100 may cause valuable movable item 201 to emit an audible alarm until a user enters a security code (e.g., using input device 115 of FIG. 1). While the embodiment of FIG. 2 recites using initiating component 100 in conjunction with a position tracking service provider (e.g., 204), the present invention is well suited to being used as a stand alone device. That is, initiating component 100 may be used to control a valuable movable item without interacting with position tracking service provider 204. For example, a user may simply desire to cause valuable movable item 201 to perform specific actions depending upon the geographic zone it is in, but not to report to position tracking service provider 204.

Figure 3:
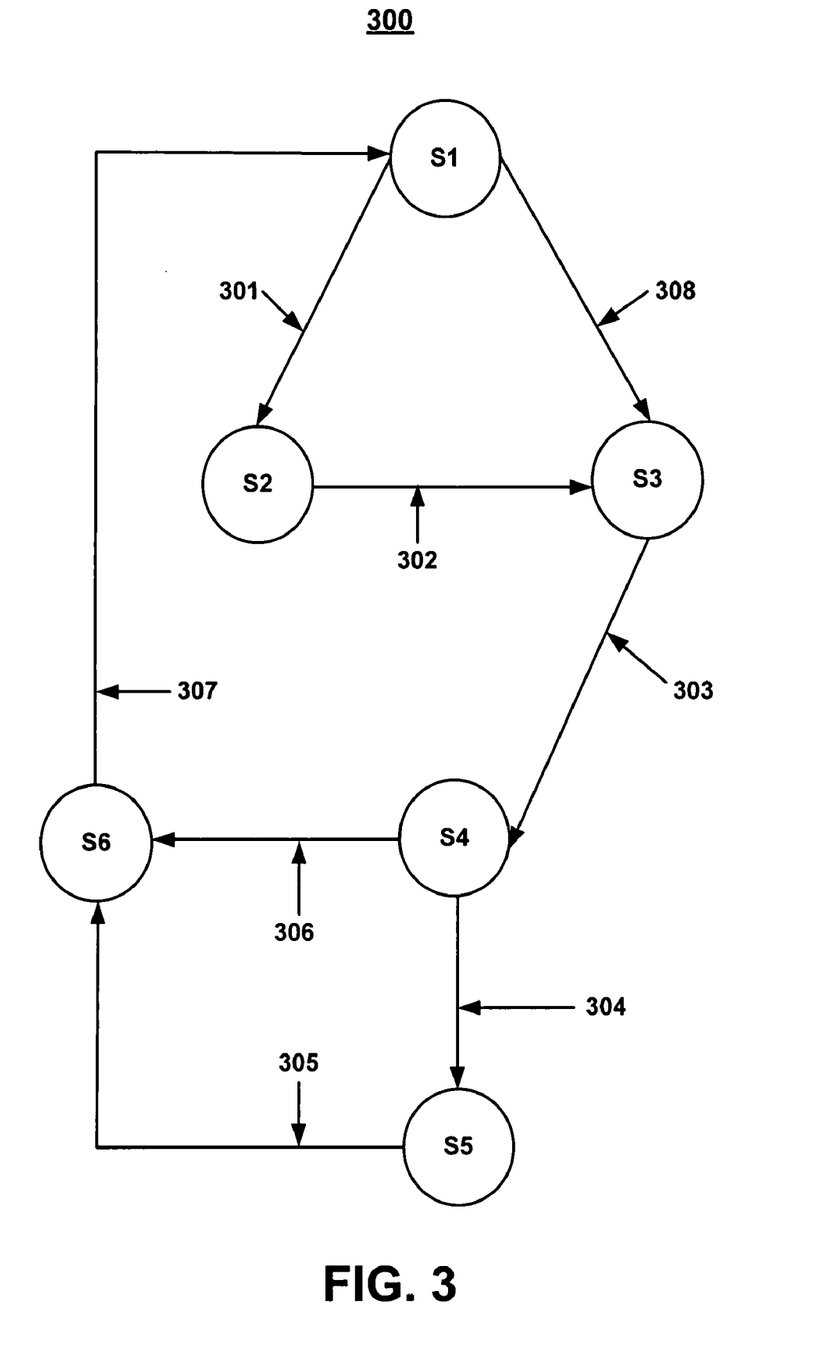
FIG. 3 is a diagram showing the operating states of an initiating component utilized in accordance with embodiments of the invention.

FIG. 3 is a state diagram 300 showing the operating states of initiating component 100 in accordance with embodiments of the present invention. In operating state S1 of FIG. 3, initiating component 100 is in an idle operating state. In embodiments of the present invention, when initiating component 100 is in its idle state, the only components drawing power can be a real time clock of processor 101 and motion detector 106. This allows initiating component 100 to remain in an operating state in which a minimal amount of power is drawn from its battery 117 or from the valuable movable item (e.g., 201 of FIG. 2) in which initiating component 100 is disposed or associated with. In embodiments of the present invention, as little as 10 µA are drawn while initiating component 100 is in idle operating state S1. Because battery drain is minimized in operating state S1, the battery replacement interval for battery 117 or the valuable movable item 201 is thus extended. This can be important for many valuable portable devices 201 in which conserving battery life is a critical issue.

At event 301 of FIG. 3, motion detector 106 can detect a change of the motion state of valuable movable item 201 and generates an interrupt to the controller (e.g., processor 101 of FIG. 1) of initiating component 100. The change of motion state may be a starting or stopping of motion, or an acceleration or deceleration of initiating component 100. In response to the interrupt from motion detector 106, processor 101 causes initiating component 100 to transition to operating state S2. Operating state S2 is an active operating state of initiating component 100 in which initiating component 100 can attempt to attain a position fix of its current geographic location using position determining component 110.

When initiating component 100 successfully determines its position within a pre-determined time period, it can automatically attempt to send a "fix" message to service provider 204 providing the current time and present geographic location of the movable item. Initiating component 100 can then continue to periodically determine its position and send that position information to service provider 204 while motion detector 106 detects that initiating component 100 is being moved. This allows service provider 204 to track initiating component 100, and thus the valuable movable item (e.g., 201) that initiating component 100 is monitoring, as it is being moved. The time period between position fixes can be determined by the pre-determined time period of operating state S6 of FIG. 3.

Note that the pre-determined time period for determining the present location of initiating component 100 can be a default setting, set by the user of initiating component 100, or set by service provider 204. If initiating component 100 cannot determine its position within the pre-determined time period, it can automatically initiate transmitting a "no-fix" message to position tracking service provider 204. The no-fix message conveys to service provider 204 that initiating component 100 has detected movement of electronic device 201 and that its position could not be determined using a position determining system (e.g., 202 or 203) within the pre-determined time period. However, in embodiments of the present invention, the position of initiating component 100 may be checked against the cellular ID sector information contained in the SMS no-fix message exchanged with service provider 204 while in operating state S4, or roughly triangulated using a plurality of mobile telephone communication (e.g., cellular) towers.

In embodiments of the present invention, when initiating component 100 is in operating state S2, processor 101 and position determining component 110 can be the only components drawing power. In embodiments of the present invention, current drain during operating state S2 is estimated to be 70 mA while initiating component 100 is determining its location.

At event 302 of FIG. 3, initiating component 100 transitions to operating state S3. In accordance with embodiments of the present invention, initiating component 100 transitions to operating state S3 from operating state S2 after successfully determining its position. Alternatively, initiating component 100 automatically transitions to operating state S3 if a time period 308 expires before motion detector 106 detects movement. Time period 308 can be a default setting, a pre-determined parameter set by the user of initiating component 100, or set by service provider 204.

If initiating component 100 has successfully determined its location using position determining component 110, it can then determine what action should be initiated based upon predefined circumstances (e.g., the current time and/or location) in operating state S3. For example, a database may be accessed from storage device 105 that describes predetermined actions to be taken based upon the current time and/or geographic location of initiating component 100. Thus, when valuable movable item 201 enters a zone defining an airport, the predetermined action may be to generate a signal to invoke a shut-down routine for movable item 201. When the valuable movable item 201 leaves the zone defining the airport, initiating component 100 may generate a signal for starting or activating movable item 201 again.

Additionally, initiating component 100 may be configured to perform different actions depending upon what zone valuable movable item 201 of FIG. 3 is currently in. For example, if initiating component 100 is used to control a laptop computer, a user can configure embodiments of the present invention so that a particular software application (e.g., a spreadsheet application) is initiated when the laptop is brought into the vicinity of the user's workplace and to initiate a different software application (e.g., a Web browser application) when the laptop is brought into the vicinity of the user's home.

As stated above, the action initiated by embodiments of the present invention may also be determined by the current location in conjunction with the current time. Thus, embodiments of the present invention may be configured to initiate one action when at a given location at a particular time and to initiate a second action at the same location but at a different time.

Within FIG. 3, at operating state S3, processor 101 can determine what action should be taken in response to the predefined circumstances (e.g., current time and/or current location) of initiating component 100. Initiating component 100 can then generate one or more commands for controlling valuable movable item 201 based upon the predefined circumstances (e.g., current time and/or geographic location). Additionally, the real time clock of processor 101 may be updated using clock information obtained by position determining component 110 during operating state S2. Furthermore, during operating state S3, the operating parameters of initiating component 100 may be checked. For example, the status of battery 117 may be checked to determine if a battery change may be necessary soon. Other parameters may include the length of time period 308, the time interval for successfully determining the present geographic location of initiating component 100 (e.g., during operating state S2), the current software version of initiating device 100 and/or the current version of the database of pre-designated geographic zones, etc.

At event 303 of FIG. 3, initiating component 100 can transition to operating state S4. In accordance with embodiments of the present invention, initiating component 100 transitions to operating state S3 from operating state S2 after successfully determining what action should be initiated based upon predefined circumstances. In operating state S4, initiating component 100 attempts to transmit data to position tracking service provider 204. For example, initiating component 100 may attempt to transmit the current time and geographic location of valuable movable item 201 to position tracking service provider 204 using wireless communications component 107. Additional information that may be sent includes the type of change in the motion state of initiating component 100. For example, the message may indicate that movement of initiating component 100 has been initiated, or stopped. Alternatively, if a pre-determined time period expires before initiating component 100 successfully determines its position (e.g., during operating state S2), initiating component 100 can transmit a message to service provider 204 conveying that valuable movable item 201 has been moved but was unable to determine its position using position determining component 110.

Additionally, the fix and no-fix messages may contain additional information such as the battery condition and current operating parameters of valuable movable item 201. By sending the battery condition information, embodiments of the present invention reduce the amount of maintenance a user needs to perform to keep valuable movable item 201 operating properly. For example, position tracking service provider 204 can send a message to the user reminding them to change the batteries in movable item 201 when it has determined that its batteries are low. In one embodiment of the present invention, a text message can be sent to the user's mobile phone 205 (e.g., cell phone), or an e-mail (electronic mail) message can be sent to the user's home or office computer 206 reminding them to change the batteries of movable item 201. Additionally, position tracking service provider 204 may determine whether an update of the database of pre-designated geographic zones should be sent to initiating component 100.

In embodiments of the present invention, when service provider 204 receives the position fix message from initiating component 100, it compares the data in the message with a set of pre-defined position parameters (e.g., set by the user) of valuable movable item 201. If the position of movable item 201 is outside of the pre-defined position parameters, a message can be sent to the user and/or law enforcement agencies telling them that valuable movable item 201 has been moved outside of the authorized position parameters. Additionally, service provider 204 can provide the position of valuable movable item 201 to (for example) law enforcement agencies to assist in recovering the device. Furthermore, service provider 204 can change the operating parameters of initiating component 100 during operating state S4 so that position fixes are sent more often in order to assist in recovering the asset 201 which is being monitored. Service provider 204 may also send a command to valuable movable item 201 causing it to perform a given action. For example, service provider 204 can send a command to movable item 201 causing it to become inactivated until it is recovered or until a security code is entered. Service provider 204 can also send a command to valuable movable item 201 causing it to sound an alarm until it is recovered or until a security code is entered.

As an example, when a user first subscribes to the position tracking services of service provider 204, they can be asked if they want to utilize geo-fencing. The user can provide the geographic coordinates of zones (or routes) of interest for valuable movable item 201 that specify an area or areas in which movable item 201 is permitted to move without initiating a warning message to the user and optionally the time period or periods which movable item 201 is permitted to be in those areas. The user can also specify one or more actions that are to be initiated by processor 101 if valuable movable item 201 enters or leaves one of the pre-defined zones or routes. If, for example, valuable movable item 201 is moved outside of this position or area or zone or route, service provider 204 contacts the user and/or law enforcement agencies and informs them that unauthorized movement of valuable movable item 201 has occurred. Service provider 204 may send a text message to the user's mobile telephone 105 (e.g., cellular), an e-mail to the user's computer 106, etc. As described above, service provider 204 may send commands which change the operating parameters of initiating component 100 that cause it to send more frequent position reports when unauthorized movement of the asset 201 is detected to assist in recovering movable item 201.

Additionally, initiating component 100 can send operating status information during operating state S4. This allows service provider 204 to monitor the operational status of valuable movable item 201 and inform its user of such. For example, initiating component 100 can report any malfunctions associated with valuable movable item 201 to service provider 204 which can be forwarded on to its user and/or appropriate repair agency. Service provider 204 can send an e-mail or other message to the user of valuable movable item 201 and/or appropriate repair agency regarding any malfunctions associated with movable item 201. Alternatively, initiating component 100 can utilize a lookup table (or table of events) to determine the occurrence of any listed event or behavior associated with valuable movable item 201. In this manner, the lookup table can induce reporting functionality from initiating component 100. Note that a wide variety of events or behaviors associated with valuable movable item 201 can be included as part of the lookup table (or table of events). Moreover, initiating component 100 can report the battery status of valuable movable item 201 and inform its user when the batteries need to be changed. For example, service provider can send an e-mail or other message to the user of valuable movable item 201 reminding them to change the batteries of the device when necessary. In embodiments of the present invention, only wireless communications component 107 can draw power during operating state S4. It is estimated that in embodiments of the present invention, initiating component 100 draws approximately 400 mA while transmitting its position in operating state S4.

At event 304 of FIG. 3, initiating component 100 transitions to operating state S5 since initiating component 100 was able to successfully transmit data during operating state S4. While in operating state S5, initiating component 100 is in a query state and can receive commands and operating parameters from service provider 204. Additionally, at this time commands can be received for changing the operating parameters of initiating component 100. For example, the time period in which position determining component 110 is allowed to determine the position of initiating component 100 can be changed during operating state S5. Other parameters may include the database defining pre-designated geographic zones for initiating action and/or the action to be taken when entering or leaving one of the pre-designated geographic zones. While the present embodiment recites these parameters specifically, the present invention is well suited for receiving commands for a variety of actions while in operating state S5. In one embodiment, while initiating component 100 is in operating state S5, only wireless communications component 107 can draw power. Again, this reduces the amount of power drawn from battery power 117 of initiating component 100 (or the battery power of valuable movable item 201) thereby extending its battery life. It is estimated that in embodiments of the present invention, initiating component 100 draws approximately 5 mA of power while in operating state S5.

At event 305, when communications with position tracking service provider 204 have completed, initiating component 100 transitions to operating state S6. Alternatively, at event 306, initiating component 100 transitions to operating state S6 if a pre-designated time interval elapses in which initiating component 100 was not able to successfully transmit data during operating state S4.

Within FIG. 3, operating state S6 can be a delay state in which initiating component 100 can be forced (or caused) to remain idle for a predetermined or predefined time period. This can set a time interval between successive position fixes and prevents initiating component 100 from drawing excessive battery power from its battery 117 (or the battery of movable item 201) in attempting to constantly determine its position while being moved. In embodiments of the present invention, initiating component 100 can draw as little as 10 µA of power while in operating state S6. The predetermined or predefined time period can be an operating parameter which can be a default setting, set by the user of initiating component 100, or by service provider 204 during operating state S5.

The length of the predetermined or predefined time period of operating state S6 can be changed during the query operating state (e.g., S5) as a result of receiving operating parameters from service provider 204. In one embodiment, if service provider 204 determines that unauthorized movement of initiating component 100 is occurring, the length of the time period of operating state S6 can be changed during operating state S5 to cause initiating component 100 to continuously or more frequently send (or output) its position to service provider 204. This facilitates locating and recovering the device 201 in which initiating component 100 is disposed or associated with. After the predetermined (or predefined) time period of operating state S6 has expired at event 307, initiating component 100 again enters operating state S1 at which point initiating component 100 can repeat the process if motion detector 106 detects that valuable movable item 201 is being moved.

Figure 4:
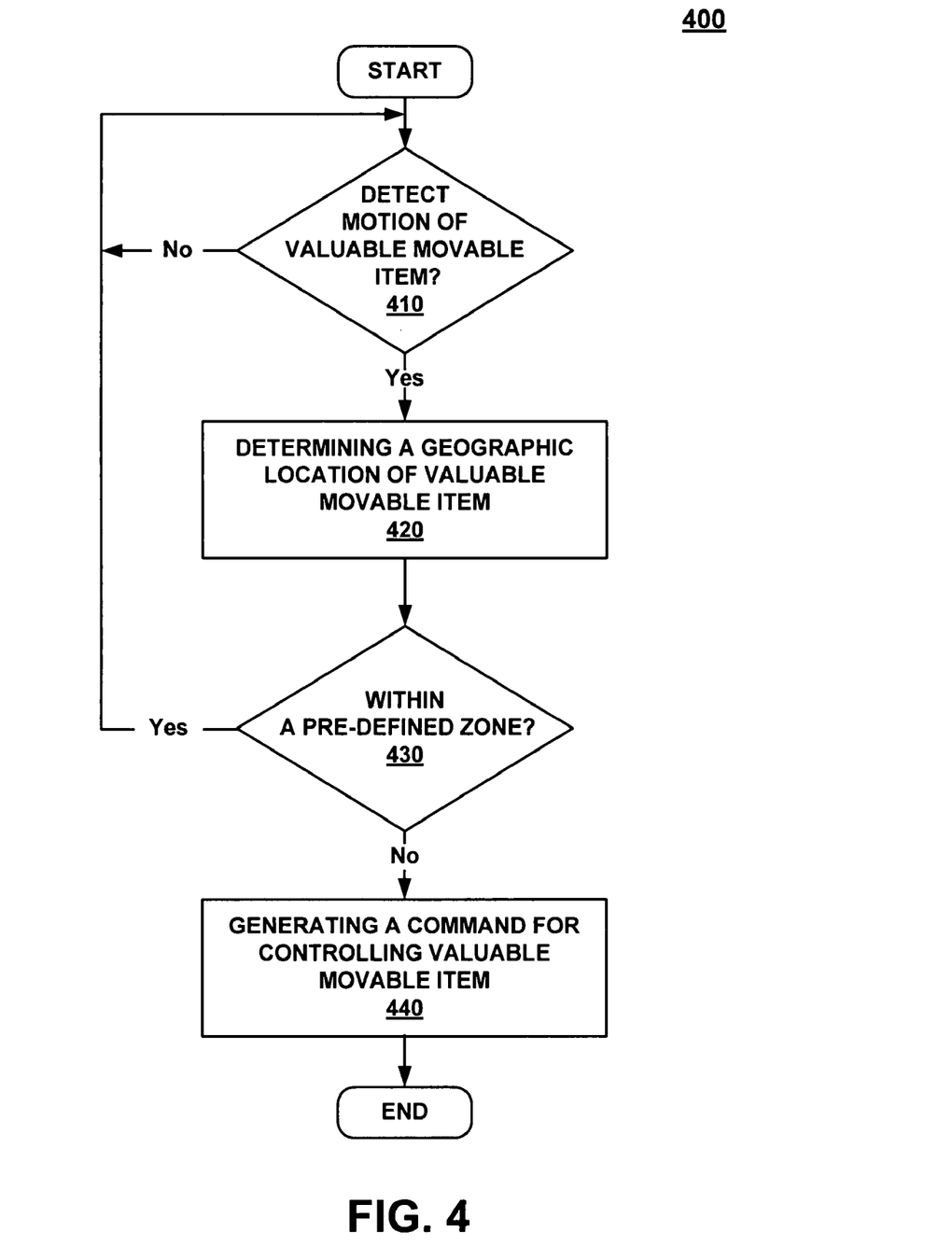
FIG. 4 is a flowchart of a method for controlling a movable item in accordance with embodiments of the invention.

FIG. 4 is a flowchart of a method 400 for controlling a valuable movable item in accordance with embodiments of the present invention. Method 400 includes processes of embodiments of the invention which can be carried out by a processor(s) and electrical components under the control of computing device readable and executable instructions (or code). The computing device readable and executable instructions (or code) may reside, for example, in data storage features such as volatile memory, non-volatile memory and/or mass data storage. However, the computing device readable and executable instructions (or code) may reside in any type of computing device readable medium. Although specific operations are disclosed in method 400, such operations are exemplary. That is, method 400 may not include all of the operations illustrated by FIG. 4. Alternatively, method 400 may include various other operations and/or variations of the operations shown by FIG. 4. It is noted that the operations of method 400 can each be performed by software, by firmware, by hardware or by any combination thereof.

At operation 410, a determination can be made as to whether any motion of a valuable movable item (e.g., 201 of FIG. 2) has been detected. If not, method 400 proceeds to the beginning of operation 410. However, if it is determined at operation 410 that motion of the valuable movable item has been detected, method 400 proceeds to operation 420. Note that detecting any motion of the valuable movable item can be implemented in a wide variety of ways in accordance with embodiments of the invention. For example, the motion of a valuable movable item can be detected using an initiating device (e.g., 100 of FIG. 1) that is disposed within or associated with the valuable movable item. According to embodiments of the present invention, the initiating device can include a motion detecting component (e.g., 106) and a controller (e.g., processor 101). The motion detector can be coupled with the controller. Motion detector 106 is for detecting changes in the state of motion of initiating device 100. For example, motion detector 106 can detect when initiating component 100 transitions from a substantially stationary state to a moving state. Motion detector 106 can also detect when initiating component 100 transitions from a moving state to a substantially stationary state and/or any changes in the rate of movement of initiating component 100.

Note that coupling a motion detecting component which detects motion with initiating component 100 is a novel method of reducing power consumption of its battery power or the battery power of valuable movable item 201 since it allows initiating component 100 to monitor the location of movable item 201 while drawing a minimal amount of power when movement has not occurred. In embodiments of the present invention, while initiating component 100 is in an idle operating state, only a real time clock of controller 101 and motion detector 106 can be drawing power. Note that initiating component 100 can be implemented such that it does not attempt to determine its geographic location unless motion detector 106 detects a change in the motion state of valuable movable item 201. Thus, the number of position fixes to monitor the location of valuable movable item 201 are minimized and power consumption is reduced.

At operation 420 of FIG. 4, the geographic location of the valuable movable item can be determined in response to detecting its motion. Note that operation 420 can be implemented in a variety of ways. In one embodiment, motion detector 106 detects the vibration associated with the movement of the valuable movable item in which initiating component 100 is disposed (or associated with) and indicates this movement to processor 101 when changes in motion are detected. In embodiments of the present invention, processor 101 can automatically cause a position determining component (e.g., 110 of FIG. 1) to determine the geographic location of valuable movable item 201 in response to receiving an interrupt from motion detector 106. In embodiments of the present invention, a terrestrial based or space based position determining system may be utilized to determine the geographic location of valuable movable item 201. Additionally, the processing of data to determine the geographic location of valuable movable item 201 may be performed by processor 101 or in conjunction with a remotely located server or computer (e.g., service provider 204 of FIG. 2).

At operation 430, a determination is made as to whether the geographic location determined at operation 420 is within a predefined zone (or region or area or route). If not, method 400 proceeds to operation 410. However, if the geographic location of the valuable movable item is determined at operation 430 to be within a predefined zone, the method 400 proceeds to operation 440. Note that operation 430 can be implemented in diverse ways. For example, in embodiments of the present invention, the present location of valuable movable item 201 can be compared with geographic coordinates that define a zone or region or area or route. These coordinates can be stored in memory (e.g., storage device 105 of FIG. 1) coupled with processor 101 or stored remotely (e.g., at service provider 204 of FIG. 4).

At operation 440 of FIG. 4, one or more commands for controlling the valuable movable item can be generated. In embodiments of the present invention, depending upon the relationship between the current geographic location of valuable movable item 201 (as determined at operation 420) and the geographic coordinates that define a particular zone, one or more commands can be generated (e.g., by processor 101) for controlling valuable movable item 201. Additionally, different commands can be generated depending upon the relationship between the current location of movable item 201 and a particular pre-defined zone (or region or route). For example, when valuable movable item 201 is within a given predefined zone, a first command can be generated for controlling movable item 201. When valuable movable item 201 is moved outside of that zone, a different command for controlling movable item 201 can be generated.

Figure 5:
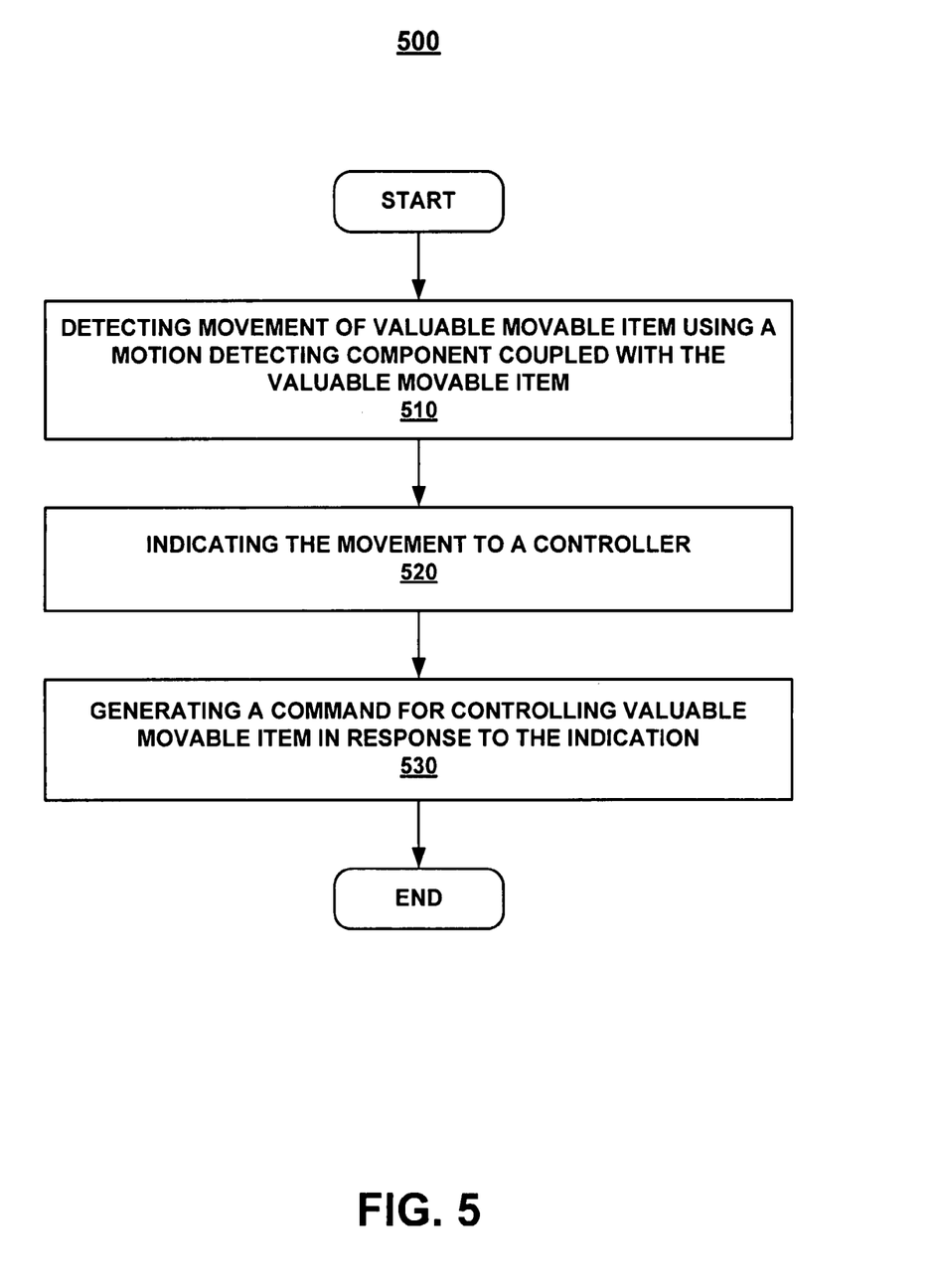
FIG. 5 is a flowchart of a method for controlling power consumption in a movable item in accordance with embodiments of the invention.

FIG. 5 is a flowchart of a method 500 for controlling power consumption in a valuable movable item in accordance with embodiments of the present invention.

Method 500 includes processes of embodiments of the invention which can be carried out by a processor(s) and electrical components under the control of computing device readable and executable instructions (or code). The computing device readable and executable instructions (or code) may reside, for example, in data storage features such as volatile memory, non-volatile memory and/or mass data storage. However, the computing device readable and executable instructions (or code) may reside in any type of computing device readable medium. Although specific operations are disclosed in method 500, such operations are exemplary. That is, method 500 may not include all of the operations illustrated by FIG. 5. Alternatively, method 500 may include various other operations and/or variations of the operations shown by FIG. 5. It is noted that the operations of method 500 can each be performed by software, by firmware, by hardware or by any combination thereof.

At operation 510, movement of a valuable movable item can be detected using a motion detecting component coupled with the movable item. According to embodiments of the present invention, a motion detecting component (e.g., 106 of FIG. 1) is coupled with a controller (e.g., processor 101) which can be coupled with an valuable movable item (e.g., 201) such as, but not limited to, a tractor, any type of cargo, any type of vehicle, any type of electronic device, a mobile telephone, a cellular telephone, a portable computing device, an automotive electrical system, or the like. In embodiments of the invention, the motion detector 106 can be part of an initiating component (e.g., 100) that is coupled with the valuable movable item 201. Motion detector 106 can be for detecting changes in the state of motion of initiating component 100. For example, motion detector 106 can detect when initiating component 100 transitions from a substantially stationary state to a moving state. Motion detector 106 can also detect when initiating component 100 transitions from a moving state to a substantially stationary state and/or changes in the rate of movement of initiating component 100. As such, motion detector 106 can detect when valuable movable item 201 transitions from a substantially stationary state to a moving state. Motion detector 106 can also detect when valuable movable item 201 transitions from a moving state to a substantially stationary state and/or changes in the rate of movement of valuable movable item 201.

Coupling a motion detecting component which detects motion with initiating component 100 is a novel method of reducing power consumption for its battery power 117 or the battery power of valuable movable item 201 since it allows initiating component 100 to monitor the location of valuable movable item 201 while drawing a minimal amount of power when movement has not occurred. In embodiments of the present invention, while initiating component 100 is in an idle operating state, only a real time clock of controller 101 and motion detector 106 can be drawing power. Note that initiating component 100 may not attempt to determine its geographic location unless motion detector 106 detects a change in the motion state of valuable movable item 201. Thus, the number of position fixes to monitor the location of valuable movable item 201 are minimized and power consumption can be reduced. In embodiments of the present invention, motion detector 106 may be implemented as, but is not limited to, an acceleration sensor, a tilt sensor, a rotation sensor, a gyroscope, etc.

At operation 520 of FIG. 5, the movement is indicated to a controller. In embodiments of the present invention, when motion detector 106 detects movement of initiating component 100, it indicates (e.g., generates an interrupt signal) this movement to the controller (e.g., processor 101).

At operation 530, one or more commands for controlling the valuable movable item can be generated in response to the indication. For example, in response to the interrupt signal, processor 101 can activate other components of initiating component 100 such as wireless communications component 107 and position determining component 110. The geographic location of initiating component 100 can then be determined using position determining component 110. Processor 101 can compare the present geographic location with geographic coordinates that define a predefined zone (or region or area or route). The coordinates of the pre-defined zone may reside in volatile memory 104 and/or storage device 105. Based upon this comparison, processor 101 can cause control element 113 to generate a command for controlling the valuable movable item in which initiating component 100 resides or is associated with.

Alternatively, processor 101 may generate the command(s) for controlling the valuable movable item itself. For example, initiating component 100 may be configured to generate one or more commands causing the valuable movable item to become inactive when it enters a restricted zone such as an theater, or the gangway leading from the departure lounge to an aircraft while boarding. Since initiating unit 100 can be programmed to operate autonomously to perform this shutdown function, it can work for items which can be stored in luggage as well, performing another valuable service by ceasing battery drain while located in an unusable space. When the valuable movable item moves outside of the restricted zone, processor 101 may generate a signal causing the movable item to become activated again. This can be a great convenience to users who may forget to turn off their valuable movable item when they enter a restricted area or to turn them back on when they leave the restricted area.

Figure 6:
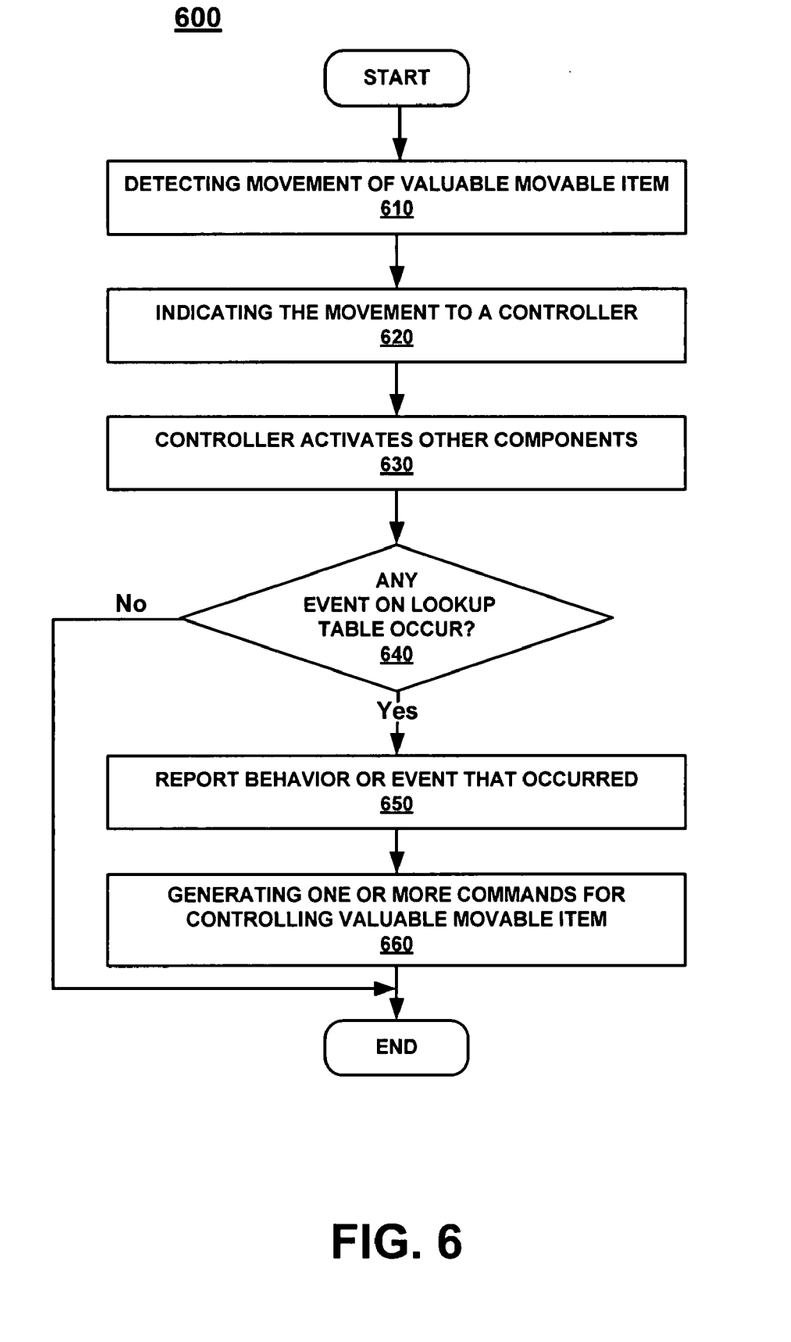
FIG. 6 is a flowchart of a method for controlling a movable item in accordance with embodiments of the present invention.

FIG. 6 is a flowchart of a method 600 for controlling a valuable movable item in accordance with embodiments of the present invention. Method 600 includes processes of embodiments of the invention which can be carried out by a processor(s) and electrical components under the control of computing device readable and executable instructions (or code). The computing device readable and executable instructions (or code) may reside, for example, in data storage features such as volatile memory, non-volatile memory and/or mass data storage. However, the computing device readable and executable instructions (or code) may reside in any type of computing device readable medium. Although specific operations are disclosed in method 600, such operations are exemplary. That is, method 600 may not include all of the operations illustrated by FIG. 6. Alternatively, method 600 may include various other operations and/or variations of the operations shown by FIG. 6. It is noted that the operations of method 600 can each be performed by software, by firmware, by hardware or by any combination thereof.

At operation 610, movement of a valuable movable item (e.g., 201) can be detected. Note that operation 610 can be implemented in a wide variety of ways. For example, a motion detecting component (e.g., 106) coupled with the valuable movable item can be utilized to detect any movement of the valuable movable item. According to embodiments of the present invention, the motion detecting component can be coupled with a controller (e.g., processor 101) which can be coupled with the valuable movable item. The valuable movable item can be implemented in any manner described herein, but is not limited to such. In embodiments of the invention, the motion detector (e.g., 106) can be part of an initiating component or device (e.g., 100) that is coupled with the valuable movable item. Note that the motion detector can be for detecting changes in the state of motion of the valuable movable item. For example, motion detector can detect when the valuable movable item transitions from a substantially stationary state to a moving state. The motion detector can also detect when the valuable movable item transitions from a moving state to a substantially stationary state and/or changes in the rate of movement of the valuable movable item.

Coupling a motion detecting component which detects motion with initiating component 100 is a novel method of reducing power consumption for its battery power 117 or the battery power of valuable movable item 201 since it allows initiating component 100 to monitor the location of valuable movable item 201 while drawing a minimal amount of power when movement has not occurred. In embodiments of the invention, while initiating component 100 is in an idle operating state, only a real time clock of controller 101 and motion detector 106 can be drawing power. Note that initiating component 100 may not attempt to determine its geographic location unless motion detector 106 detects a change in the motion state of valuable movable item 201. Thus, the number of position fixes to monitor the location of valuable movable item 201 are minimized and power consumption can be reduced. In embodiments of the present invention, motion detector 106 may be implemented as, but is not limited to, an acceleration sensor, a tilt sensor, a rotation sensor, a gyroscope, a motion sensor, etc.

At operation 620 of FIG. 6, the movement of the valuable movable item can be indicated to a controller. In embodiments of the present invention, when motion detector 106 detects movement of the valuable movable item (and/or initiating component 100), it can indicate (e.g., generates an interrupt signal) this movement to the controller (e.g., processor 101) at operation 620.

At operation 630, the controller can activate other components in response to the movement indication associated with the valuable movable item. It is understood that operation 630 can be implemented in diverse ways. For example, the controller (e.g., processor 101) can activate other components of an initiating component (e.g., 100) such as a wireless communications component (e.g., 107) and a position determining component (e.g., 110).

At operation 640 of FIG. 6, a determination can be made as to whether one or more predefined events of a lookup table have occurred while the newly activated components were in an idle or sleep state. If not, method 600 is exited. However, if it is determined at operation 640 that one or more predefined events of a lookup table have occurred, method 600 proceeds to operation 650.

It is appreciated that operation 640 can be implemented in a wide variety of ways. For example, the controller (e.g., processor 101) can determine whether one or more predefined events of the lookup table or table of events have occurred while the newly activated components were in an idle state. For instance, one of the "events" that can be included as part of the lookup table is to determine whether there are any malfunctions associated with the valuable movable item. If there are any malfunctions, the newly activated wireless communications component can be used by the controller to transmit a wireless message reporting any malfunctions and can also request assistance related thereto. Alternatively, the lookup table can include the "event" determining the geographic location of the valuable movable item (or initiating component 100) using the position determining component 110. Another "event" of the lookup table can include determining whether the present geographic location of the valuable movable item (or initiating component 100) is within a predefined zone (or region or area or route). The predefined zone can be defined by geographic coordinates which may reside in volatile memory 104 and/or storage device 105. Yet another "event" of the lookup table can be that the valuable movable item (or initiating component 100) is moving when it should not be moving. Another "event" of the lookup table can be that the valuable movable item (or initiating component 100) is not moving when it should be moving.

At operation 650, the controller can report the occurrence of the one or more events or behaviors of the lookup table (or table of events). In this manner, the events or behaviors of the lookup table induce reporting upon their occurrence. Note that operation 650 can be implemented in diverse ways. For example, the controller can utilize the newly activated wireless communications component (e.g., 107) to send a wireless message to a service provider (e.g., 204) in order to report the occurrence of one or more events or behaviors of the lookup table. The service provider can then forward the message to the user of the valuable movable item or any other organization (e.g., law enforcement agency, repair organization, and the like). In embodiments of the invention, a text message can be sent to the user's mobile phone (e.g., 205), or an e-mail message can be sent to the user's home or office computer (e.g., 206) that describes or lists the occurrence of one or more events or behaviors of the lookup table.

At operation 660 of FIG. 6, one or more commands for controlling the valuable movable item can be generated. In embodiments of the present invention, depending upon the one or more events of the lookup table that have occurred, one or more commands can be generated for controlling the valuable movable item. For example, when valuable movable item (e.g., 201) is within a given predefined zone or route, a first command can be generated for controlling movable item. When valuable movable item (e.g., 201) is moved outside of that zone or route, a different command for controlling movable item can be generated. Note that the one or more commands generated for controlling the valuable movable item at operation 660 can be implemented in any manner similar to that described herein, but is not limited to such. Once operation 660 is completed, method 600 can be exited.

Embodiments in accordance with the invention can be formed by any combination of methods 400, 500, and 600. Furthermore, two or more operations of methods 400, 500, and 600 can be combined to form embodiments in accordance with the invention.

Note that the valuable movable item mentioned in associated with embodiments of the invention can be implemented in a wide variety of ways. For example, the valuable movable item can be implemented as, but not limited to, a Caterpillar® Articulated Truck such as the Three Axis models 725, 730, 735, 740, and 740 Ejector; a Caterpillar Backhoe Loader such as the Center-Pivot models 416D, 420D, 430D, 446B, and 446D, or the Center-Pivot with Integrated Toolcarrier models 420D IT and 430D IT; a Caterpillar Cold Planar such as model PM-565B; a Caterpillar Compactor such as the Soil models 815F and 825G Series II, Landfill models 816F, 826G Series II, and 836G, and Vibratory Soil models CP-323C, CP-433E, CP-533E, CP-563E, CP-633E, and CS-323C; a Caterpillar Forest Machine such as models 320C FM, 322C FM, 325C FM, and 330C FM; a Caterpillar Front Shovel such as models 5090B, 5130B FS, and 5230B FS; a Caterpillar Hydraulic Excavator such as the Mini models 301.5, 301.6, 301.8, 302.5, 303 CR, 304 CR, and 305 CR, and Small models 307C, 307C SB, 308C CR, 311C CR, 311C Utility, and 312C L; a Caterpillar Material Handler such as the Track-Type models 320C MH, 325C MH, 330C MH, 345B MH Series II, 365B MH, and 375 MH, and the Wheel models M318 MH, M320 MH, M325C L MH, and W345B Series II MH; a Caterpillar Motor Grader such as models 120H Global, 12H Global, 135H Global, 140H Global, 14H Global, and 160H Global, and All Wheel Drive models 143H Global, 143H, 163H Global, and 163H, and Mining model 16H; a Caterpillar Multi Terrain Loader such as models 247B, 257B, 267B, 277B, and 287B; a Caterpillar Off-Highway Tractor such as models 776D and 784C; a Caterpillar Off-Highway Truck such as models 769D, 773E, 775E, and 777D, and the Quarry models 771 D and 775D, and the Mining Trucks models 785C, 789C, and 793C; a Caterpillar Paving Equipment such as the Asphalt Paver models AP-1000B, AP-800C, AP-900B, BG-230, BG-240C, and BG-260C, and the Asphalt Paver—Track Paver models AP-1050B, AP-650B, BG-225C, and BG-245C; a Caterpillar Pipelayer such as the Medium models 561 N and 572R Series II, and the Large models 583R and 589; a Caterpillar Road Reclaimer such as models RM-250C and RM-350B; a Caterpillar Wheel Tractor-Scraper such as the Elevating models 613C Series II, 615C Series II, and 623G, and the Coal Bowl models 637E Series II and 657E, and the Open Bowl models 621G, 627G, 631G, and 637G; a Caterpillar Skid Steer Loader such as models 216B, 226B, 232B, 236B, 242B, 246B, 248B, 252B, 262B, and 268B; a Caterpillar Soil Stabilizers such as models RM-350B and SS-250B; a Caterpillar Telehandler such as models TH220B, TH330B, TH340B, TH350B, and TH560B; a Caterpillar Track Loader such as the Small model 939C Hystat, the Medium model 953C, the Large models 963C and 973C, and the Waste Handling Arrangement models 953C WH, 963C WM, and 973C WH; a Caterpillar Track-Type Tractor such as the Small models D3G, D4G, and D5G, the Medium models D5N, D6N, D6N FA, D6R Series II, and D7R Series II, and the Large models D10R, D11R, and D11R CD; and a Caterpillar Wheel Dozer such as the Medium models 814F, 824G Series II, and 834G, and the Large models 844 and 854G.

The foregoing descriptions of specific embodiments of the invention have been presented for purposes of illustration and description. They are not intended to be exhaustive or to limit the invention to the precise forms disclosed, and obviously many modifications and variations are possible in light of the above teaching. While the invention has been described in particular embodiments, it is appreciated that the invention should not be construed as limited by such embodiments, but rather construed according to the following claims.

What is claimed is:

1. A method for controlling a valuable movable item comprising:
   detecting motion of said valuable movable item using an initiating device coupled with said valuable movable item, said initiating device comprising:
      a controller;
      a position determining component coupled with said controller; and
      a motion detecting component coupled with said controller;
   ascertaining a geographic location of said valuable movable item in response to said detecting motion;
   determining if said geographic location is within a predefined zone; and
   generating a command for controlling said valuable movable item in response to said determining.

2. The method as recited in claim 1, wherein said ascertaining said geographic location comprises using a satellite-based position determining system to determine said geographic location.

3. The method as recited in claim 1, wherein said ascertaining said geographic location comprises using a terrestrial-base position determining system to determine said geographic location.

4. The method as recited in claim 1, further comprising sending a message using a wireless communications component coupled with said controller.

5. The method as recited in claim 4, wherein said controller automatically causes said wireless communications component to transmit said message when said geographic location is determined to be outside said pre-defined zone.

6. The method as recited in claim 4, wherein said message comprises information about a malfunction associated with said valuable movable item.

7. The method as recited in claim 4, further comprising utilizing a lookup table to detect an event associated with said valuable movable item and induce said sending said message.

8. The method as recited in claim 4, wherein said sending the message comprises conveying said geographic location using said wireless communications component.

9. The method as recited in claim 1, wherein said valuable movable item is selected from the group consisting of a vehicle, a cargo, a tractor, a backhoe, an off-highway tractor, an off-highway truck, a paving equipment device, an electronic device, a tractor scraper, a computer, a tool, an appliance, a cellar telephone, a portable computer device, a laptop computer, and an automotive electrical system.

* * * * *